(12) United States Patent
Iriyama et al.

(10) Patent No.: US 7,416,515 B2
(45) Date of Patent: Aug. 26, 2008

(54) ENGINE TORQUE CONTROL DEVICE

(75) Inventors: Masahiro Iriyama, Yokohama (JP); Takuya Maekawa, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 256 days.

(21) Appl. No.: 11/245,433

(22) Filed: Oct. 7, 2005

(65) Prior Publication Data

US 2006/0234830 A1   Oct. 19, 2006

(30) Foreign Application Priority Data

Oct. 12, 2004   (JP) .............................. 2004-298135

(51) Int. Cl.
*B60W 10/04* (2006.01)
*F16H 61/04* (2006.01)

(52) U.S. Cl. ...................... 477/107; 477/143

(58) Field of Classification Search ................ 477/107, 477/109, 110, 111, 113, 143; 74/335; 701/66
See application file for complete search history.

(56) References Cited

U.S. PATENT DOCUMENTS

| | | | |
|---|---|---|---|
| 4,653,351 A * | 3/1987 | Downs et al. ............... | 477/148 |
| 5,036,729 A * | 8/1991 | Nitz et al. ................... | 477/148 |
| 5,445,576 A * | 8/1995 | Motamedi et al. .......... | 477/105 |
| 6,254,509 B1 * | 7/2001 | Meyer ......................... | 477/109 |
| 6,345,529 B1 | 2/2002 | Eskilson | |
| 6,597,978 B1 | 7/2003 | Dreibholz et al. | |

FOREIGN PATENT DOCUMENTS

| | | |
|---|---|---|
| DE | 4329007 A1 | 3/1994 |
| DE | 4330194 A1 | 3/1994 |
| DE | 4232973 A1 | 4/1994 |
| EP | 0305594 A | 3/1989 |
| JP | 5-229363 A | 9/1993 |

\* cited by examiner

*Primary Examiner*—Roger Pang
(74) *Attorney, Agent, or Firm*—Global IP Counselors, LLP (57) ABSTRACT

An engine torque control device is configured to lessen shift shock while shortening the shift time during downshifting with an automatic transmission. When a downshift requirement is generated, a disengagement control of a higher gear clutch (current gear ratio) is commenced, and at the same time, a first synchronizing control is commenced. The first synchronizing control has a torque-up control with a first synchronizing speed DNe1 set as the target speed TNe, during a first control period. When the first control period has concluded and there is a transition to a second control period. In the second control period, an engagement control of a lower gear clutch (the post-shift gear ratio) is commenced, and at the same time, there is a switch to a second synchronizing control. In the second synchronizing control, the target speed TNe is set to a second synchronizing speed DNe2 at the post-shift gear ratio.

17 Claims, 4 Drawing Sheets

ENGINE TORQUE CONTROL DEVICE

CROSS-REFERENCE TO RELATED APPLICATIONS

This application claims priority under 35 U.S.C. § 119 to Japanese Patent Application No. 2004-298135. The entire disclosure of Japanese Patent Application No. 2004-298135 is hereby incorporated herein by reference.

BACKGROUND OF THE INVENTION

1. Field of the Invention

The present invention relates to an engine torque control device that controls engine output during the shifting of an automatic transmission to shorten the shift time and reduce shift shock.

2. Background Information

There is a known technique with which shift shock is reduced by performing a shift only after engine output torque has been increased during the downshifting of an automatic transmission having a stepped shifting mechanism, thereby bringing the engine speed closer to the post-downshift speed (see for example, Japanese Laid-Open Patent Publication No. 5-229363).

In view of the above, it will be apparent to those skilled in the art from this disclosure that there exists a need for an improved engine torque control device. This invention addresses this need in the art as well as other needs, which will become apparent to those skilled in the art from this disclosure.

SUMMARY OF THE INVENTION

It has been discovered that when, as discussed above, engine output is increased after a higher gear clutch has begun to slip, this slippage decreases engine speed and the shift takes correspondingly longer to complete, and when the torque converter is not locked up, the decrease in engine speed caused by the torque converter has to be made up, which means that the shift takes even longer to complete. This increase in shift time is a particular problem when shifting in a manual shift mode, because the driver cannot make quick shifts. As a result, there is a loss of operating feel.

Also, when a one-way clutch is employed in which a higher gear clutch transmits drive force in only one direction, from the engine to the automatic transmission, slippage of the one-way clutch, which occurs before shifting in the automatic shift mode, or in the manual mode when a lock-up clutch used to ensure engine braking is disengaged, causes the rotating elements on the engine side to rotate relatively in the opposite direction from the drive transmission with respect to the rotating elements closer to the transmission, so any subsequent engine output increase may result in an unpleasant crunching noise when the rotating elements on the engine side are switched to the drive transmission direction with respect to the rotating elements closer to the transmission.

The present invention was conceived in light of these problems encountered in the past. One object of the present invention is to afford better shifting by lessening shift shock while shortening the shift time by quickly commencing control (synchronizing control) whereby during a shift, engine speed is brought closer to the post-shift speed.

Accordingly, with the present invention, synchronizing control is performed to control engine output during a shift operation of an automatic transmission so that the engine speed substantially matches the post-shift engine speed, with the engine output control being commenced before disengagement of shift elements begins to be disengaged. In other words, in order to achieve the object, the present invention provides an engine torque control device comprising an automatic transmission control section and an engine output torque control section. The automatic transmission control section is configured to perform an automatic transmission control of an automatic transmission by selectively disengaging at least one engaged shift element, and selectively engaging at least one disengaged shift element. The engine output torque control section is configured to perform an engine output torque control of an engine output torque from an engine such that engine speed approaches a post-shift engine speed during a shift operation of the automatic transmission. The engine output torque control section is further configured to commence the engine output torque control before the at least one engaged shift element to be disengaged begins to be disengaged.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
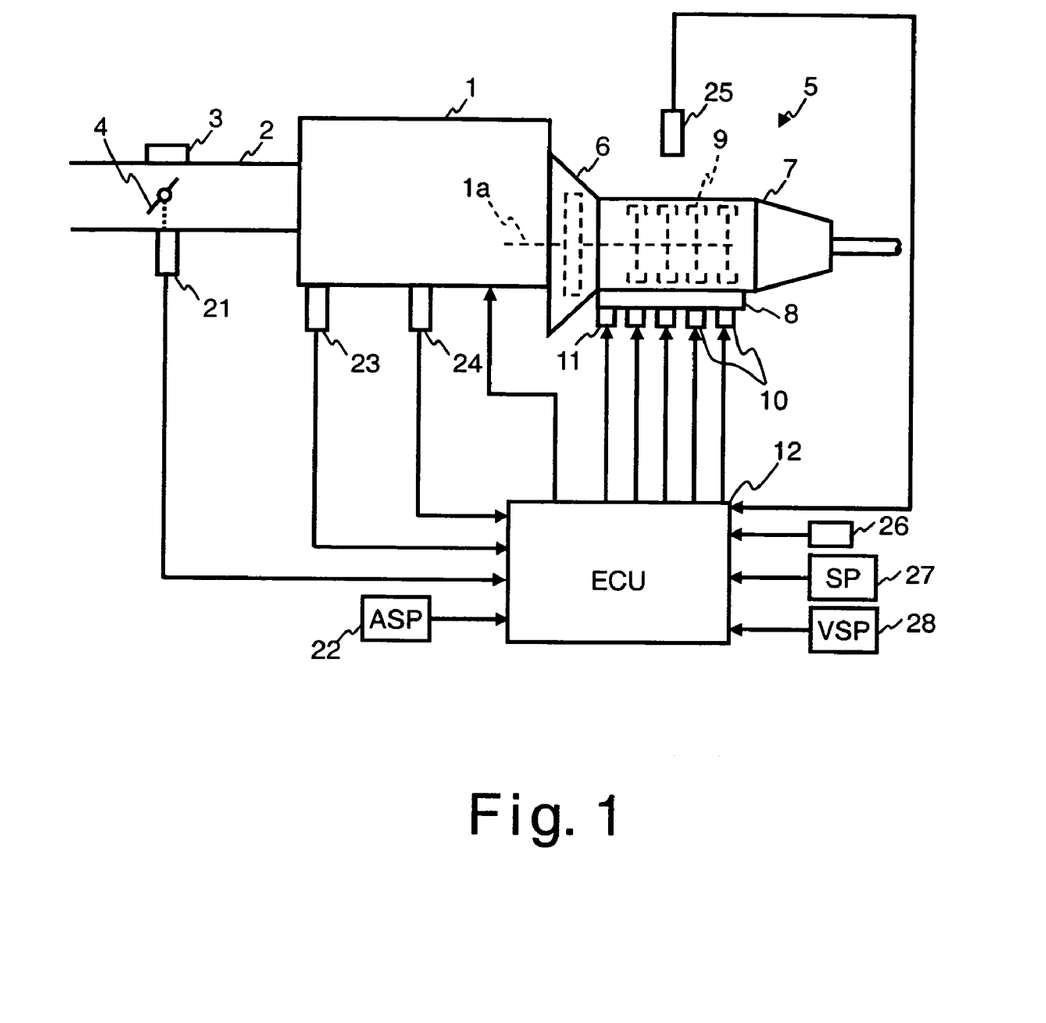
FIG. 1 is a schematic diagram of an internal combustion engine that is equipped with an engine torque control device or system in accordance with one embodiment of the present invention.

Referring initially to FIG. 1, an internal combustion engine 1 is schematically illustrated that is equipped with an engine torque control device or system in accordance with one embodiment of the present invention. In FIG. 1, the engine 1 receives intake air through an air intake passage 2 such that the intake air is supplied to each cylinder of the engine 1. The intake air passing through the air intake passage 2 to each cylinder is regulated by controlling a throttle motor 3 that operates a throttle valve 4. The operation of the throttle valve 4 by the throttle motor 3 can be accomplished in a conventional manner. Since operation of the throttle valve 4 by the throttle motor 3 can be accomplished in a conventional manner, these structures will not be discussed or illustrated in detail herein.

An automatic transmission 5 is linked to an output shaft 1a of the engine 1 in a conventional manner. This automatic transmission 5 has an automatic shift mode as well as a manual shift mode that allows the driver to shift manually. The automatic transmission 5 basically includes a torque converter 6, a shifting mechanism (gear mechanism) 7 and a hydraulic control mechanism 8. The torque converter 6 is linked to the output shaft 1a of the engine 1, with the shifting mechanism 7 being linked to the output side of this torque converter 6. The hydraulic control mechanism 8 is configured and arranged to selectively engage and disengage various shift elements 9 (clutches, etc.) in the shifting mechanism 7.

The working hydraulic pressure of the hydraulic control mechanism 8 is controlled through various electromagnetic valves. The various electromagnetic valves are conventional components that are well known in the art. Since electromagnetic valves are well known in the art, these structures will not be discussed or illustrated in detail herein. Rather, only four shift solenoids 10 and a lock-up solenoid 11 will be depicted herein for the sake of simplicity and brevity. The shift solenoids 10 are configured and arranged to perform an automatic shifting operation. The lock-up solenoid 11 is configured and arranged to perform to lock up the torque converter 6 for transferring torque directly from the engine to the automatic transmission 5. The shift solenoids 10 and the lock-up solenoid 11 are operatively connected to an electronic control unit (ECU) 12, which selectively controls the engagement and disengagement of the shift solenoids 10 and the lock-up solenoid 11.

The electronic control unit 12 preferably includes a microcomputer with an engine control program that controls the operation of the engine 1 and an automatic shifting control program that controls the shift solenoids 10 and the lock-up solenoid 11 as well as electromagnetic valves to perform upshifting and downshifting operations. Thus, electronic control unit 12 includes an automatic transmission control section and an engine control section with the engine control section having an engine output torque control section. The electronic control unit 12 also preferably includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the electronic control unit 12 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Various signals are inputted to the electronic control unit 12 from various sensors including, but not limited to, a throttle sensor 21, an accelerator operation sensor 22, a water or coolant temperature sensor 23, an engine speed sensor 24, a gear position sensor 25, a shift mode switch 26, a shift position sensor 27, and a vehicle speed sensor 28. The throttle sensor 21 is configured and arranged to detect throttle opening amount or degree of the throttle valve 4, and output a signal indicative of the throttle opening degree of the throttle valve 4 to the electronic control unit 12. The accelerator operation sensor 22 is configured and arranged to detect the accelerator pedal depression amount APS, and output a signal indicative of the accelerator pedal depression amount APS to the electronic control unit 12. The water or coolant temperature sensor 23 is configured and arranged to detect the engine cooling water or coolant temperature Tw, and output a signal indicative of the engine coolant temperature Tw to the electronic control unit 12. The engine speed sensor 24 is configured and arranged to detect the engine speed Ne, and output a signal indicative of the engine speed Ne to the electronic control unit 12. The gear position sensor 25 is configured and arranged to detect the gear position Gp of the gear mechanism of the automatic transmission 5, and output a signal indicative of the gear position Gp to the electronic control unit 12. The shift mode switch 26 is configured and arranged to set the shift mode (automatic shift mode or manual shift mode) of the automatic transmission 5, and output a signal indicative of the current shift mode to the electronic control unit 12. The shift position sensor 27 is configured and arranged to detect the shift lever position SP, and output a signal indicative of the shift lever position SP to the electronic control unit 12. The vehicle speed sensor 28 is configured and arranged to detect the vehicle speed VSP, and output a signal indicative of the vehicle speed VSP to the electronic control unit 12.

The electronic control unit 12 basically includes an engine control unit (EGCU) 12A configured to perform engine control, and an automatic transmission control unit 12B configured to perform shift control on the automatic transmission side.

In automatic shift mode, the automatic transmission control unit 12B sets the optimal gear by referring to a preset map, etc., and controls the shift solenoids 10 so that the optimal gear is achieved, on the basis of the accelerator operation amount APS and the vehicle speed VSP. In the manual shift mode, the automatic transmission control unit 12B sets the gear to one gear higher or one gear lower than the current gear, according to whether the driver has used the shift lever to make an upshift or a downshift, and selectively controls the shift solenoids 10 so that the selected gear is achieved.

Meanwhile, the engine control unit 12A performs engine output control by performing engine control such as fuel injection control and ignition timing control on the basis of signals from the various sensors mentioned above. Also, the engine control unit 12A computes the target engine torque, and drives the throttle motor 3 to control the opening of the throttle valve 4 so that this target engine torque will be obtained. Engine output control during a downshift (synchronizing control) executed by the engine control unit 12A will now be described with reference to FIG. 2.

Figure 2:
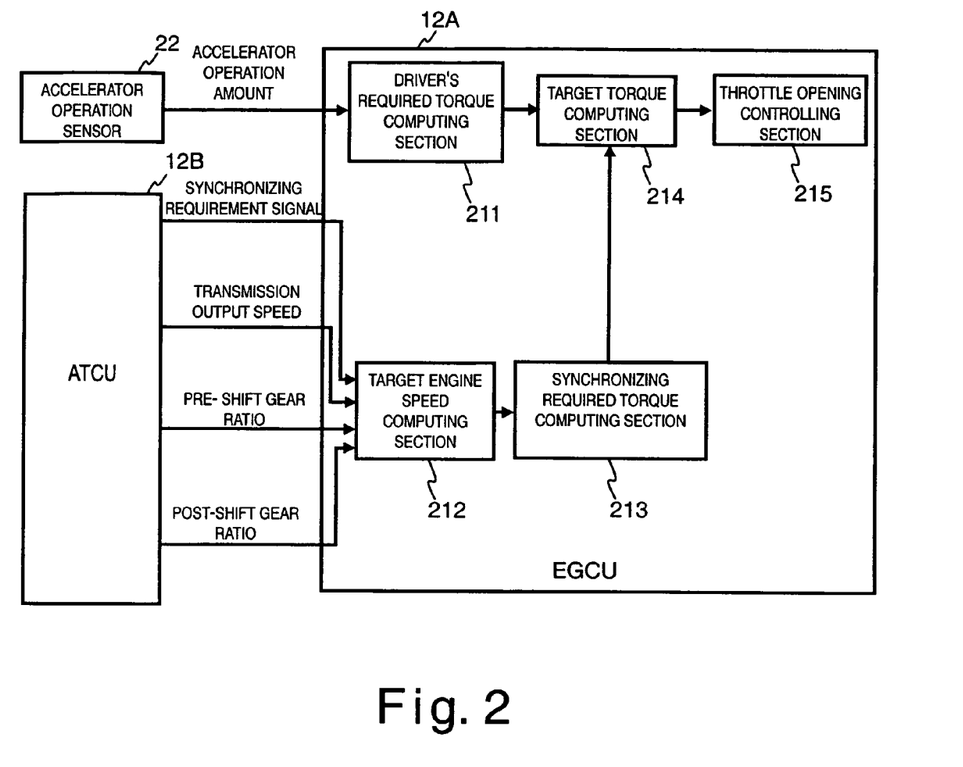
FIG. 2 is a simplified block diagram illustrating synchronizing control during a downshift operation using the engine torque control device in accordance with one embodiment of the present invention.

FIG. 2 is a simplified block diagram of the engine output control executed by the engine control unit 12A during a downshift operation. In order to carry out a downshift operation, the engine control unit 12A basically includes a driver's required torque computing section 211, a target engine speed computing section 212, a synchronizing required torque computing section 213, a target torque computing section 214, and a throttle opening controlling section 215. With the engine output control executed by the engine control unit 12A, as discussed below, synchronizing control begins before the disengagement of the shift elements 9 is commenced, which reduces the drop in engine speed caused by disengagement of the shift elements 9, while allowing the engine speed to be quickly raised and brought closer to the synchronized speed, shortening the shift time and lessening the shift shock, and thereby ensuring good shifting. Shifting can be particularly enhanced in the manual shift mode, and when a downshift is performed by uncoupling the one-way clutch on the higher gear side, a crunching noise can be prevented from occurring by reducing the drop-off in engine speed.

The driver's required torque computing section 211 is configured to compute a driver's required torque TTEIF as an engine torque required by the driver on the basis of the accelerator operation amount APS from the accelerator operation sensor 22.

The target engine speed computing section 212 is configured to output a target engine speed TNe based on at least one of a synchromesh requirement signal (synchromesh requirement flag), a transmission output shaft speed signal (i.e., vehicle speed signal), a current pre-shift gear position signal, and a post-shift gear signal from the automatic transmission control unit 12B. When a downshift is made in the manual shift mode, that is, when a need for synchronizing control arises, initially the target engine speed TNe synchronized to the pre-shift gear is computed by the target engine speed computing section 212 on the basis of the pre-shift gear position signal. Then, after a specific amount of time has elapsed, the target engine speed TNe synchronized to the post-shift gear is computed by the target engine speed computing section 212 on the basis of the post-shift gear signal. This computation of the target engine speed TNe by the target engine speed computing section 212 will be described in detail later.

The synchronizing required torque computing section 213 is configured to compute a synchronization required torque TQTMSTAC as an engine torque necessary to achieve the target engine speed computed by the target engine speed computing section 212. The synchronizing required torque computing section 213 is configured to output the synchronization required torque TQTMSTAC to the target torque computing section 214.

The target torque computing section 214 is configured to compute (selects) a final target torque as the larger of the driver's required torque TTEIF computed by the driver's required torque computing section 211 and the synchronization required torque TQTMSTAC computed by the synchronization required torque computing section 213. The final target torque is outputted by the target torque computing section 214 to the throttle opening controlling section 215.

The throttle opening controlling section 215 is configured to compute the target throttle opening according to the final target torque selected by the target torque computing section 214, and then feedback control the throttle opening on the basis of the target throttle opening.

When a downshift is required, the accelerator pedal is either not depressed, or is depressed only a small amount, so the synchronization required torque TQTMSTAC becomes smaller. The target torque computing section 214 then selects the synchronization required torque TQTMSTAC that is larger than the driver's required torque TTEIF, and synchronizing control for downshifting is performed. When no downshift is required, the driver's required torque TTEIF becomes larger, the driver's required torque TTEIF is selected, and ordinary torque control is performed according to the driver's needs.

Figure 3:
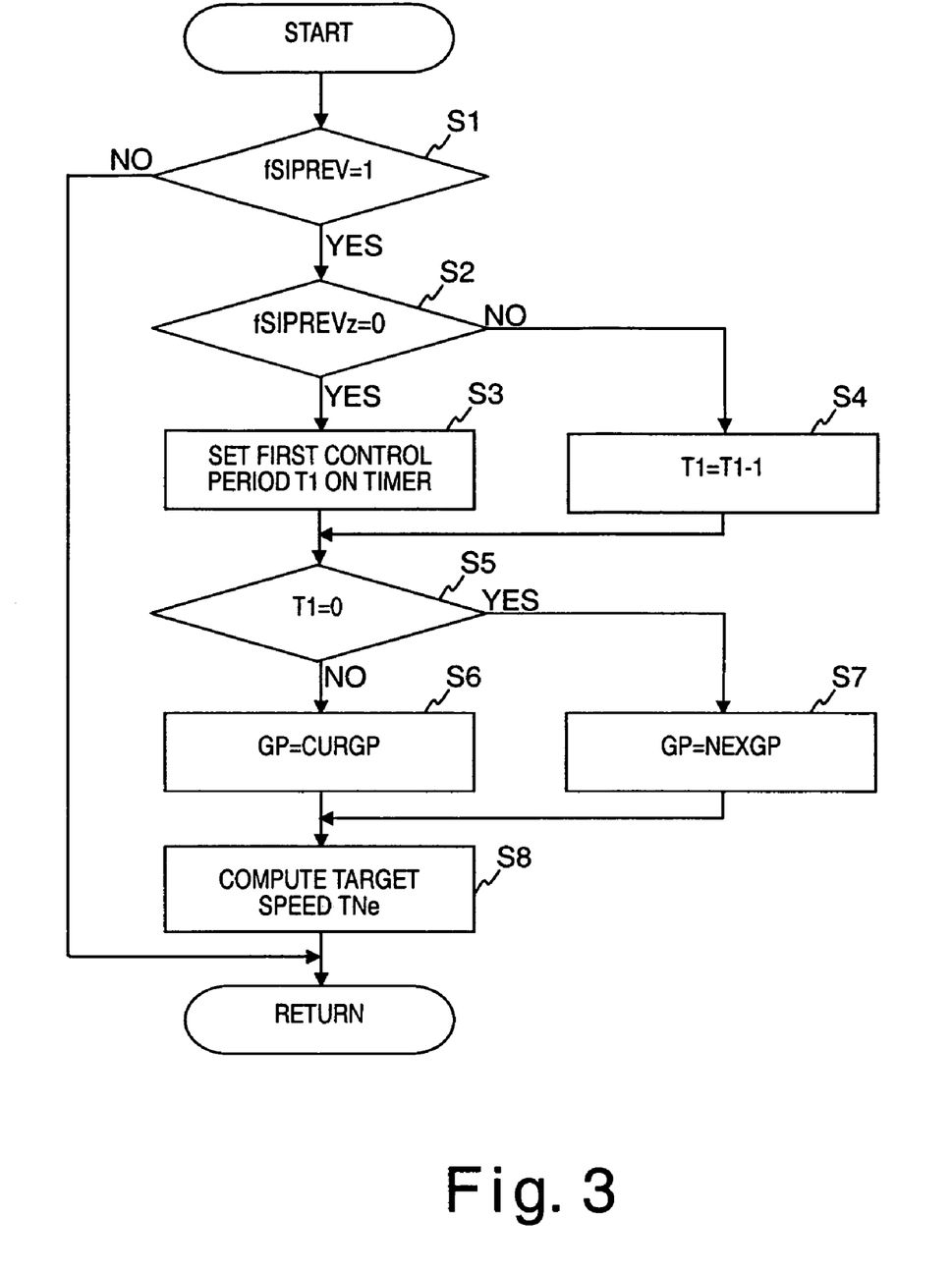
FIG. 3 is a flowchart illustrating the processing that is executed by the engine torque control device during of the synchronizing control illustrated in FIG. 2 in accordance with one embodiment of the present invention.

FIG. 3 is a flowchart showing the computation of the target engine speed TNe by the target engine speed computing section 212 in accordance with one embodiment of the present invention.

In step S1, the target engine speed computing section 212 determines whether or not a synchronizing requirement flag fSIPREV inputted from the automatic transmission control unit 12B has been set to 1. The synchronizing requirement flag fSIPREV is set to 1, when the driver makes a downshift in the manual shift mode, and simultaneously with this setting, the disengagement control is commenced by the automatic transmission control unit 12B for disengaging a pre-shift higher gear clutch that is currently engaged. When the target engine speed computing section 212 determines in step S1 that the synchronizing requirement flag fSIPREV is set to 1, the processing proceeds to step S2, where the previous value fSIPREVz of the synchronizing requirement flag FSIPREV is determined.

In step S2, if the previous value fSIPREVz is 0, that is, immediately after the disengagement control of a higher gear clutch has been commenced simultaneously with a downshift operation, then the flow proceeds to step S3. If the previous value fSIPREVz is not 0, then the processing proceeds to step S4.

In step S3, the target engine speed computing section 212 sets a first control period T1, in which the engine speed is controlled to an initial target speed in synchronizing control. Also in step S3, the target engine speed computing section 212 sets a timer T for measuring the first control period. Specifically, the first control period T1 is set through reference to a map and on the basis of the vehicle speed V and the downshift pattern (fourth gear→third gear, third gear→second gear, second gear→first gear). Preferably, a different first control period T1 is set for each of the downshifts.

The next time and thereafter in step S2, the previous value of the synchronizing requirement flag fSIPREV will be determined to be 1, such that the processing proceeds to step S4, and the value of the timer is counted down.

In step S5, the target engine speed computing section 212 determines whether or not the timer count value T1 has reached 0. Until the timer count value T1 reaches 0, the first control period is determined to be in effect until the higher gear clutch has been completely disengaged. Once the higher gear clutch has been completely disengaged, the processing proceeds to step S7. Otherwise, the processing proceeds to step S6.

In step S6, the target engine speed computing section 212 selects the current gear ratio CURGP as the gear ratio GP for computing the target engine speed TNe in step S8.

Meanwhile, if the target engine speed computing section 212 determines in step S5 that the count value of the timer T1 is 0, then the target engine speed computing section 212 determines that the higher gear clutch has been completely disengaged and a transition to the second control period has been made. Thus, processing proceeds to step S7, where a post-shift gear ratio NEXGP is selected as the gear ratio GP for computing the target engine speed TNe in step S8.

In step S8, the target engine speed TNe is computed for the first and second control periods T1 and T2. For the first control period T1, the target engine speed TNe is to be equal to the synchronizing speed DNe1. For the second control period T2, the target engine speed TNe is to be equal to the synchronizing speed DNe2. The synchronizing speed DNe1 or DNe2 is the engine output speed at which the speed on the input side of the higher gear clutch matches the speed on the output side at the gear ratio GP selected for each control period, as discussed above. The synchronizing speed DNe1 or DNe2 is computed from the following equation as the target engine speed TNe.

$$TNe = VSP \cdot R \cdot GP$$

where: VSP: vehicle speed (transmission output shaft speed), and

R: calculated value for tire diameter×final gear ratio.

Thus, in step S8, the target engine speed TNe is computed for the first control period T1 such that the actual engine speed Ne approaches a value that is close to the target engine speed TNe at the end of the first control period T1. Also the target engine speed TNe is computed for the second control period T2, such that the actual engine speed Ne approaches a value that is close to the target engine speed DNe2 at the end of the second control period. In other words for the second control period, the target engine speed computing section 212 detects, for example, when the actual engine speed Ne approaches the target speed TNe of the second control period, which is equals DNe2. Once, the target engine speed TNe has been set for each control period, the synchronizing requirement flag fSIPREV is then set to 0 in step S8. Thus the routine is concluded with the determination in step S1, and the synchronizing control (second control period) is concluded.

Figure 4:
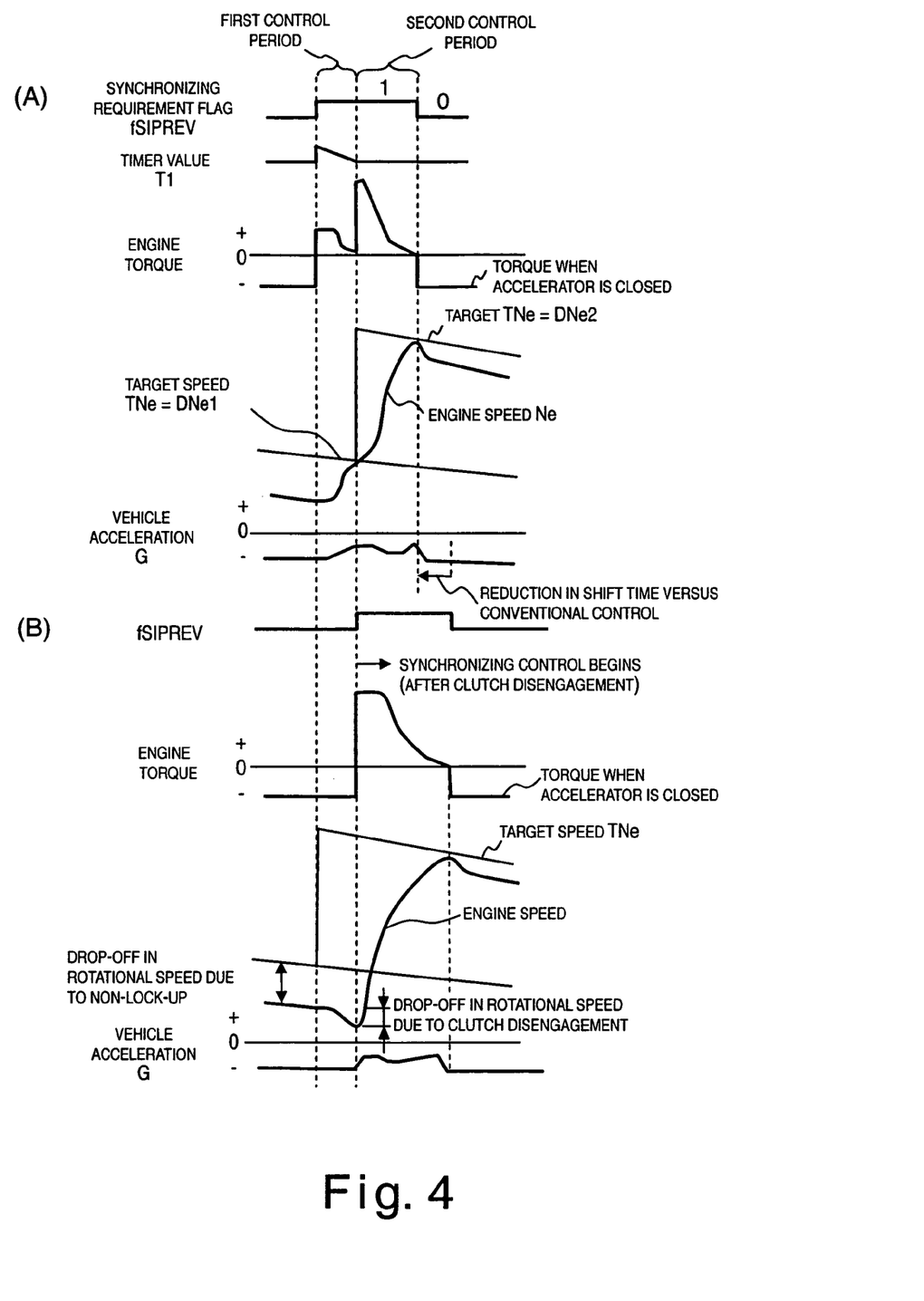
FIG. 4 is a time chart showing the changes in the various states of selected vehicle parameter occurring during in the synchronizing control executed by the engine torque control device of the present invention as seen in part (A) in comparison to the changes in the various states of selected vehicle parameter occurring during conventional control as seen in part (B).

FIG. 4 is a timing chart showing the changes in the various states of selected vehicle parameter occurring during in the synchronizing control executed by the engine torque control device of the present invention as seen in part (A) in comparison to the changes in the various states of selected vehicle parameter occurring during conventional control as seen in part (B).

As shown in FIG. 4, a downshift requirement is generated by a downshift operation in the manual shift mode, which commences the disengagement control of the higher gear clutch engaged at the pre-shift current gear ratio CURGP. At the same time, the first synchronizing control is commenced. The first synchronizing control includes a torque-up control in which the synchronizing speed DNe1 at the current gear ratio CURGP is set as the target engine speed TNe. This first synchronizing control is continued during the first control period. As a result, at the point when the disengagement of the higher gear clutch is complete, that is, at the point when the transmission is in neutral, speed drop-off due to clutch disengagement is suppressed while the engine speed Ne increases until the engine speed decrease is eliminated that is due to resistance of the torque converter 6 that is a non-lock-up state.

When the first control period is concluded and there is a transition to the second control period, the engagement control of the lower gear clutch begins corresponding to the post-shift gear ratio NEXGP. At the same time, there is a switch to the second synchronizing control in which the target engine speed TNe is set to the synchronizing speed DNe2 at the post-shift gear ratio NEXGP. As a result, the engine speed Ne is quickly raised in a state that is close to the neutral state at the outset of the clutch engagement control. Thus, the engine speed Ne is raised to the synchronizing speed DNe2 during the time between the start of actual engagement and the conclusion of engagement.

The first and second synchronizing controls are subjected to feedback control by PID (proportional, integral, and derivative) control or the like according to the deviation between the target engine speed TNe and the actual engine speed Ne. After torque has been increased considerably at the outset when the deviation is great, as shown in FIG. 4, the torque is lowered as the deviation decreases, which allows the engine speed to approach the synchronizing speed DNe1 smoothly, without overshooting and with good response.

Here, if the synchronizing speed DNe2 at the post-shift gear ratio NEXGP is controlled as the target engine speed TNe right from the start, there is a possibility that the engine speed Ne will increase sharply to the extent that it exceeds the synchronizing speed at the current gear ratio CURGP before the higher gear clutch has completely disengaged. This situation will produce a jerky feel during deceleration, which means that good drivability cannot be maintained. With this embodiment, the control period is split up and synchronizing control is performed by switching the target engine speed TNe, so that in the first control period, the engine speed Ne can be raised as much as possible while still avoiding such excessive increases in speed. As a result, after the transition to the second control period, the engine speed Ne can be quickly raised to the post-shift synchronizing speed in just a short time.

Therefore, compared to when synchronizing control is commenced after the disengagement of the higher gear clutch has begun (after slippage has begun), as in the comparative example, the shift time can be shortened and shift shock prevented, which affords better shifting. Particularly when downshifting in the manual shift mode, it is possible to achieve both quick shifts and a reduction in shift shock.

Also, as discussed above, when the higher gear clutch comprises a one-way clutch, if the synchronizing control is commenced when the one-way clutch is in a slipping state, an unpleasant crunching noise was produced when the rotating elements on the engine side were switched to the drive transmission direction with respect to the rotating elements closer to the transmission. However, with the present invention, the engine output control is commenced before the disengagement of shift elements 9 is begun, so it is possible to prevent the slippage of the one-way clutch that occurs in the disengagement of a lock-up clutch used to ensure engine braking in manual mode. Furthermore, a first control period is provided in which the control amount is different from that in the second control period, that is, the target engine speed is the pre-shift input speed during the first control period, which allows the pre-shift slippage in automatic shift mode to be eliminated smoothly, or to be sufficiently reduced, so crunching noises can be avoided.

Also, with this embodiment, since the first control period, in which it is assumed that the disengagement of the higher gear clutch is completed, is set on the basis of the shift pattern and the vehicle speed, it can be set very precisely. However, for the sake of ease, the first control period can instead be set as the period until a specific amount of time has elapsed since the generation of a downshift requirement.

The present invention has its greatest effect during downshifting, and particularly during downshifting in manual shift mode, but is also effective in downshifting in automatic shift mode.

It is also possible to apply the present invention to upshifting. For instance, synchronizing control corresponding to the pre-shift lower gear ratio is performed by torque-up control simultaneously with an upshift requirement, and then synchronizing control corresponding to the post-shift higher gear ratio is performed, which allows the shift time to be kept short while reducing the rotational speed on the input shaft side of the higher gear clutch, thereby synchronizing the rotational speed on the output shaft side, and avoiding shift shock (jerkiness) during engagement.

As used herein to describe the above present invention, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine torque control device comprising:
an automatic transmission control section configured to perform an automatic transmission control of an automatic transmission by selectively disengaging at least one engaged shift element, and selectively engaging at least one disengaged shift element; and
an engine output torque control section configured to perform an engine output torque control of an engine output torque from an engine with a first control amount during a first control period being preset in advance to a specific time, in which the at least one engaged shift element to be disengaged is disengaged, such that engine speed approaches a post-shift engine speed during a shift operation of the automatic transmission,
the engine output torque control section being further configured to commence the engine output torque control before the at least one engaged shift element to be disengaged begins to be disengaged, and
the engine output torque control section being further configured to perform the engine output torque control with the first control amount during the first control period that lasts up to a specific point from the start of the control, and a second control amount during a second control period from the specific point up to the completion of a shift, with the first and second control amounts being different.

2. The engine torque control device according to claim 1, wherein
the engine output torque control section is further configured to commence the engine output torque control when a disengage command has been outputted to the at least one shift element to be disengaged.

3. The engine torque control device according to claim 1, wherein
the engine output torque control section is further configured to perform the engine output torque control with the first control amount during the first control period until the specific time has elapsed since the start of the engine output control.

4. The engine torque control device according to claim 3, wherein
the engine output torque control section is further configured to switch the specific time according to a type of shift occurring and vehicle speed.

5. The engine torque control device according to claim 1, wherein
the engine output torque control section is further configured to set the first control period as one in which a target engine speed is an input speed to the automatic transmission prior to shifting, and the second control period as one in which the target engine speed is the input speed to the automatic transmission after shifting.

6. The engine torque control device according to claim 1, wherein
the engine output torque control section is further configured to perform the engine output torque control during a downshift operation.

7. The engine torque control device according to claim 6, further comprising
a one-way clutch as one of the at least one disengaged shift element to be engaged with the one-way clutch being configured to only permit a drive force to be transmitted from an engine side to an automatic transmission side.

8. The engine torque control device according to claim 1, further comprising
a torque converter disposed between the engine and the automatic transmission.

9. The engine torque control device according to claim 2, wherein
the engine output torque control section is further configured to perform the engine output torque control with the first control amount during the first control period, in which the disengagement of the at least one engaged shift element to be disengaged is assumed to be completed.

10. The engine torque control device according to claim 2, wherein
the engine output torque control section is further configured to perform the engine output torque control with the first control amount during the first control period until a specific time has elapsed since the start of the engine output control.

11. The engine torque control device according to claim 10, wherein
the engine output torque control section is further configured to switch the specific time according to a type of shift occurring and vehicle speed.

12. The engine torque control device according to claim 2, wherein
the engine output torque control section is further configured to set the first control period as one in which a target engine speed is an input speed to the automatic transmission prior to shifting, and the second control period as one in which the target engine speed is the input speed to the automatic transmission after shifting.

13. The engine torque control device according to claim 2, wherein
the engine output torque control section is further configured to perform the engine output torque control during a downshift operation.

14. The engine torque control device according to claim 13, further comprising
a one-way clutch as one of the at least one engaged shift element to be disengaged with the one-way clutch being configured to only permit a drive force to be transmitted from an engine side to an automatic transmission side.

15. The engine torque control device according to claim 2, further comprising
a torque converter disposed between the engine and the automatic transmission.

16. An engine torque control device comprising:
automatic transmission control means for performing an automatic transmission control of an automatic transmission by selectively disengaging at least one engaged shift element, and selectively engaging at least one disengaged shift element; and engine output torque control means for performing an engine output torque control of an engine output torque from an engine with a first control amount during a first control period being preset in advance to a specific time, in which the at least one engaged shift element to be disengaged is disengaged, such that engine speed approaches a post-shift engine speed during a shift operation of the automatic transmission, and for commencing the engine output torque control before the at least one engaged shift element to be disengaged begins to be disengaged, the engine output torque control means further performing the engine output torque control with the first control amount during the first control period that lasts up to a specific point from the start of the control, and a second control amount during a second control period from the specific point up to the completion of a shift, with the first and second control amounts being different.

17. A method of controlling engine torque comprising:

controlling an automatic transmission by selectively disengaging at least one engaged shift element, and selectively engaging at least one disengaged shift element;

controlling engine output torque of an engine by performing an engine output torque control of an engine output torque from an engine with a first control amount during a first control period being preset in advance to a specific time, in which the at least one engaged shift element to be disengaged is disengaged, such that engine speed approaches a post-shift engine speed during a shift operation of the automatic transmission; and commencing the engine output torque control before the at least one engaged shift element to be disengaged begins to be disengaged, the performing the engine output torque control further including performing the engine output torque control with the first control amount during the first control period that lasts up to a specific point from the start of the control, and a second control amount during a second control period from the specific point up to the completion of a shift, with the first and second control amounts being different.

* * * * *